United States Patent [19]

Amano et al.

[11] Patent Number: 4,998,280

[45] Date of Patent: Mar. 5, 1991

[54] SPEECH RECOGNITION APPARATUS CAPABLE OF DISCRIMINATING BETWEEN SIMILAR ACOUSTIC FEATURES OF SPEECH

[75] Inventors: Akio Amano, Higashimurayama; Nobuo Hataoka, Shiroyama; Shunichi Yajima, Hachioji; Akira Ichikawa, Musashino, all of Japan

[73] Assignee: Hitachi, Ltd., Tokyo, Japan

[21] Appl. No.: 409,991

[22] Filed: Sep. 19, 1989

Related U.S. Application Data

[63] Continuation of Ser. No. 129,994, Dec. 8, 1987, abandoned.

[30] Foreign Application Priority Data

Dec. 12, 1986 [JP] Japan ................................. 61-29703
Feb. 18, 1987 [JP] Japan ................................. 62-33261

[51] Int. Cl.⁵ .............................................. G10L 7/08
[52] U.S. Cl. ...................................................... 381/43
[58] Field of Search ................................... 381/41–46; 364/513.5

[56] References Cited

U.S. PATENT DOCUMENTS

| | | | |
|---|---|---|---|
| 4,624,010 | 11/1986 | Takebayashi | 381/43 |
| 4,624,011 | 11/1986 | Watanabe | 381/43 |
| 4,625,287 | 11/1986 | Matsuura et al. | 381/43 |
| 4,712,243 | 12/1987 | Nimomiya et al. | 381/43 |
| 4,715,004 | 12/1987 | Kabasawa et al. | 381/43 |
| 4,723,290 | 2/1988 | Watanabe et al. | 381/43 |

Primary Examiner—Dale M. Shaw
Assistant Examiner—John A. Merecki
Attorney, Agent, or Firm—Antonelli, Terry, Stout & Kraus

[57] ABSTRACT

A speech recognition apparatus including a memory for storing with respect to each feature specific to a particular phoneme a name of a process and a procedure of the process which is performed in order to search whether the presence of a feature specific to a certain type of speech is included in a feature vector series, and for storing a table in which the names of the processes in a performed for all the categories of speech to be recognized. The information stored in the memory is used to discriminate between two categories and provides ways for interpreting the results of the process. The recognition processes performed the discrimination is done in accordance with the information stored in the table.

11 Claims, 10 Drawing Sheets

FIG. 2

| | NAME OF THE PROCEDURE | THE CONTENT OF PROCEDURE |
|---|---|---|
| 1 | PLOS | DETECTION OF PLOSIVE FEATURE FROM INPUT PATTERN SERIES |
| 2 | CMPCT | DETECTION OF COMPACTNESS OF BURST SPECTRA FROM INPUT PATTERN SERIES |
| 3 | DFS | DETECTION OF DIFFUSENESS OF BURST SPECTRA FROM INPUT PATTERN SERIES |
| 4 | BUZ | DETECTION OF BUZZ-BER FROM INPUT PATTERN SERIES |
| 5 | TRNS | DETECTION OF SLOW CHANGE OF INPUT PATTERN |
| 6 | FRIC | DETECTION OF FRICATIVE FEATURE FROM INPUT PATTERN SERIES |
| 7 | LTRL | DETECTION OF A SPECTRA WHICH IS PROPER TO /r/ SOUND |
| 8 | LENG | DETECTION OF LONG DURATION OF CONSONANT CHARACTERISTICS FROM INPUT PATTERN SERIES |

FIG. 4

| | PAIR OF SYLLABLE | NAME OF DETECTION PROCEDURE | THE WAY OF DECISION FROM DETECTION RESULTS | | |
|---|---|---|---|---|---|
| | | | CASE OF DETECTED | CASE OF UNDETECTED | CASE OF UNDECIDABLE |
| 1 | /a/-/ka/ | PLOS | /ka/ | /a/ | — |
| 2 | /a/-/ta/ | PLOS | /ta/ | /a/ | — |
| 3 | /ka/-/ta/ | CMPCT | /ka/ | /ta/ | — |
| ⋮ | ⋮ | ⋮ | ⋮ | ⋮ | ⋮ |

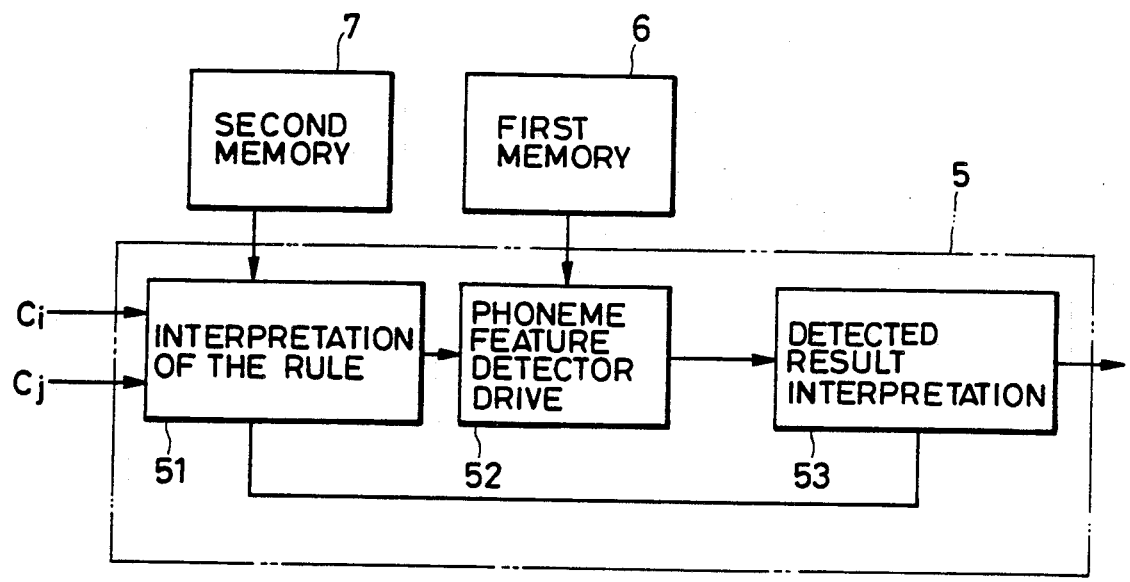

FIG. 9(a)

| TOTAL INPUTS | NUMBER OF CORRECTS AFTER CANDIDATE SELECTION (A) | NUMBER OF CORRECTS AFTER PAIR DISCRIMINATION (B) | NUMBER OF IMPROVEMENTS (B-A) |
|---|---|---|---|
| 2360 | 1967 | 2008 | 41 |

FIG. 9(b)

| | | | |
|---|---|---|---|
| 1 | /u/ - /ku/ | 8 | /ka/ - /da/ |
| 2 | /i/ - /ki/ | 9 | /shi/ - /chi/ |
| 3 | /shi/ - /ji/ | 10 | /a/ - /ka/ |
| 4 | /ka/ - /ta/ | 11 | /hi/ - /shi/ |
| 5 | /ko/ - /to/ | 12 | /i/ - /ri/ |
| 6 | /ka/ - /ha/ | 13 | /sa/ - /ha/ |
| 7 | /ka/ - /ga/ | 14 | /ta/ - /ga/ |

FIG. 11(a)
| YO | TO | HA | WA |
| RO | KO | KA | MA |
| WO | PO | TA | NA |
FIG. 11(b)  YO  KO  HA  MA
YO  KO  KA  WA
FIG. 11(c)  ( HA      KA )
( MA      WA )

SPEECH RECOGNITION APPARATUS CAPABLE OF DISCRIMINATING BETWEEN SIMILAR ACOUSTIC FEATURES OF SPEECH This application is a continuation of application Ser. No. 129,994, filed Dec. 8, 1987, now abandoned.

BACKGROUND OF THE INVENTION

The present invention relates to a speech recognition method for a speech recognition apparatus such as a speech typewriter, and particularly to a speech recognition apparatus which is suitable for discriminating similar types of speech, is able to readily investigate the cause of incorrect recognition, and is suitable for systematically improving its performance.

As described in IEEE, Trans. on Acoustic Speech and Signal Processing ASSP-23, No. 1 (1975) pp 67–72, conventional speech recognition apparatuses use a method in which standard patterns have been previously prepared for all the categories of a certain type of speech to be recognized, and an input pattern is matched with each of these standard patterns so as to obtain the result of recognition with the highest similarity. In addition, as a measure that can be taken when sufficient similarity cannot be obtained by the matching undertaken in the above-described method, a method is employed as described in Japanese Patent Laid-Open No. 36824/1980 in which patterns carrying partial features of a type of speech are stored as partial standard patterns, and a particular portion of an input pattern is matched with the abovedescribed partial standard patterns so as to obtain a final result of recognition on the basis of the results of the comparison.

In the above-described prior art, information used as a standard of recognition is held in the form of standard patterns. Recognition is performed on the basis of the matching with the standard patterns, but such a method has a problem that speech categories naturally having similar acoustic features cannot be discriminated well. In addition, since the features of a particular type of speech are implicitly involved in the standard patterns, a person cannot judge whether the process undertaken in the course of recognition is correct or not. In other words, when incorrect recognition occurs, it can only be judged that the main cause is the poorness of the standard patterns There are therefore problems that the performance of a recognition apparatus has to be improved by a method of trial and error and, thus, no knowledge is accumulated and no improvements in performance can be expected, as well as with regard to the fact that the internal condition of a recognition system cannot be displayed on a monitor and hence its performance cannot be improved systematically.

SUMMARY OF THE INVENTION

It is an object of the present invention to provide a speech recognition method which can solve the above-described problems of the prior art, recognize similar speech categories with high precision, systematically perform the process of improving the performance of a recognition apparatus, and has the capacity to accumulate knowledge, as well as the function to allow it to explain by itself the cause of an incorrect recognition.

The above object can be achieved by providing a means for holding the name and the procedure of a process for each feature specific to each phoneme in which it is judged whether the features specific to a phoneme are present or absent in a feature vector series; and a table in which there are given the names of the above-described process which is performed so as to discriminate the two categories in each pair of categories for all the categories of a particular speech form to be recognized, and the way in which the results of that process is interpreted, so that recognition processing is performed by a pair of discriminations in accordance with the description in the table.

In the present invention, all the $_nC_2$ pairs of n recognition candidates selected in a candidate selection unit are determined and are subjected to pair discriminations so that a candidate showing a suitable recognition result is decided for each pair of candidates. The pair discriminations are performed on the basis of the description in the above-described table.

It is described below how the above-described configuration enables a process of improving performance to be systematically performed.

Although it is necessary when investigating the cause of an incorrect recognition to determine which discrimination in the $_nC_2$ pair discriminations was wrong, this determination may be made by referring to the results of the $_nC_2$ pair discriminations because they are held.

With respect to a pair producing a wrong discrimination, it is possible to refer to the table in order to decide which processing produced an error in the search for the presence of a feature specific to a particular phoneme.

Therefore, the internal conditions of a recognition system can be displayed on a monitor.

With regard to achieving improvements in the recognition performance, since a process that produces a wrong discrimination in the search for the presence of a feature specific to a particular phoneme can be found, this process may be improved. In addition, since the table also describes a way of interpreting the results of the process, a method of improving can be found by referring to the table, thereby facilitating systematic improvements.

In addition, in the present invention, the procedure for discriminating between two categories independently for each pair among all the categories of a particular speech form to be recognized is such that, when an improvement is made for a particular pair, only the two categories involved in this pair are concerned with the improvement, the other categories not being concerned. Therefore, the improvement of one portion does not adversely affect the other portions.

BRIEF DESCRIPTION OF THE DRAWINGS

FIG. 2 is an explanatory view of the configuration of a first memory;

FIG. 4 is an explanatory view of the configuration of a second memory;

FIG. 7 is a drawing of an embodied configuration of a pair discrimination unit 5;

FIG. 8 is an explanatory view of the processing of a decision unit 8;

FIGS. 9() to 9(b) are drawings of the results of recognition experiments performed by using the embodiment;

FIGS. 11(a) to 11(c) are drawings of the intermediate results obtained in the course of processing.

DESCRIPTION OF THE PREFERRED EMBODIMENTS

Figure 1:
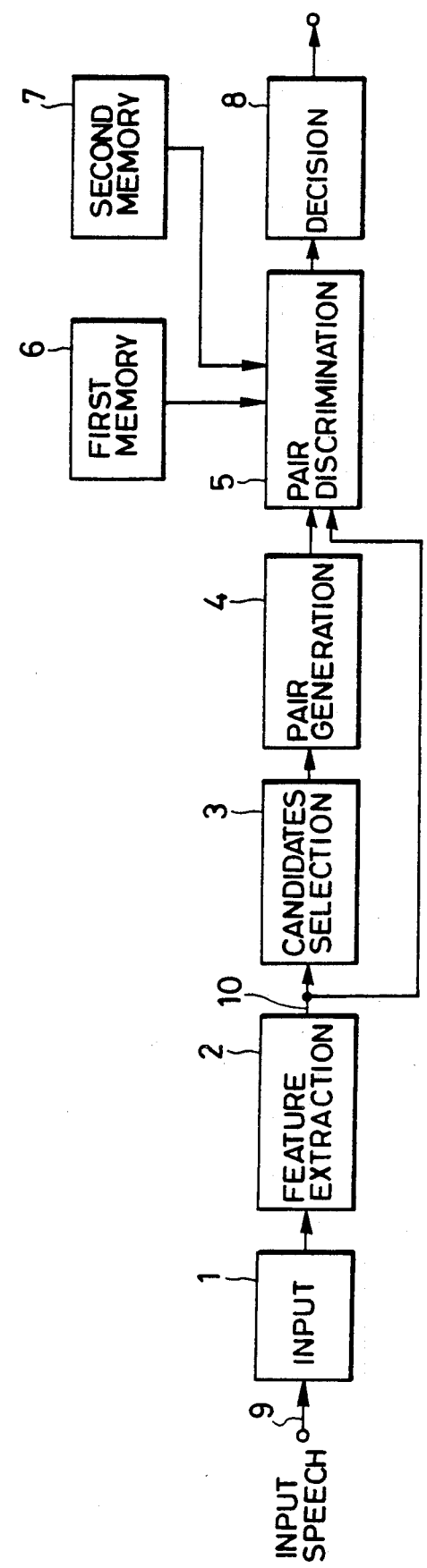
FIG. 1 is a block diagram of an embodiment of the present invention.

An embodiment of the present invention is described below with reference to FIG. 1.

Input speech 9 input from an input unit 1 is changed into feature vectors showing features of the speech for each of a given series of time and output as a feature vector series 10. In a candidate selection unit 3, the feature vector series 10 is input therein and n high-ranking candidates (for example n =5) of the categories of speech which are present in the input are output The n candidates selected in the candidate selection unit 3 are sent into a pair generation unit 4. In the candidate selection unit 3, standard patterns of speech have been previously provided so that some categories of the speech are selected as candidates by matching the feature vectors 10 obtained by a feature extraction unit 2 with the standard patterns The pair generation unit 4 generates $_nC_2$ pairs (when n=5, $_nC_2$=10) which are objects for pair discrimination and sends them into a pair discrimination unit 5. Although the pair discrimination unit 5 performs pair discrimination for each of the $nC_2$ pairs which are sent from the pair generation unit 4, the operation described below is for one pair only. If two categories a, b of speech are given, the pair discrimination unit 5 detects whether the features specific to a phoneme (for example, plosive, fricative, and buzz bar) which are clues for the discrimination of the categories a, b are present or not present in the input feature vector series In regard to this processing, the name and the procedure of the processing have been previously stored in a first memory 6 for each of the features specific to each phoneme. The names of the processing performed for discriminating each pair of categories and the methods in which the results of the processing are interpreted is also stored in a second memory 7.

When the categories a, b are given, a search is made by referring to the contents of the second memory 7 to determine the method of processing of the feature vector series which is suitable for discriminating the pair a, b. Since the procedure of the processing determined is stored in the first memory 6, the processing is performed by referring to the procedure. Although the judgment as to whether the input speech is a or b must be made on the basis of the results of the processing, the discrimination is performed on the basis of the discrimination method previously stored in the second memory 7. At this stage, the pair discrimination is completed for the pair a, b, but pair discriminations are performed for all the other remaining pairs in the same procedure. In this way, the results of the pair discriminations of the $nC_2$ pairs are obtained from the pair discrimination unit 5 and then aggregated in a decision unit 8. The n candidates are ranked on the basis of these aggregated results and then output as the final results The ranking may be performed, for example, by using a method in which the number of times a candidate is decided as a candidate in the pair discrimination for each candidate and the candidates are then ranked in the order of the number clocked up for each.

The procedure of performing the pair discrimination using the information stored in the first and the second memories is described in detail below.

A description is made of the first memory with reference to FIG. 2. In the first memory, are stored the name of the processing for detecting each feature specific to each phoneme and the procedure corresponding to that name. The eight features shown in FIG. 2 can be considered as the features specific to a phoneme. The content of the detection processing for each feature is shown in the column for processing in FIG. 2.

Figure 3A:
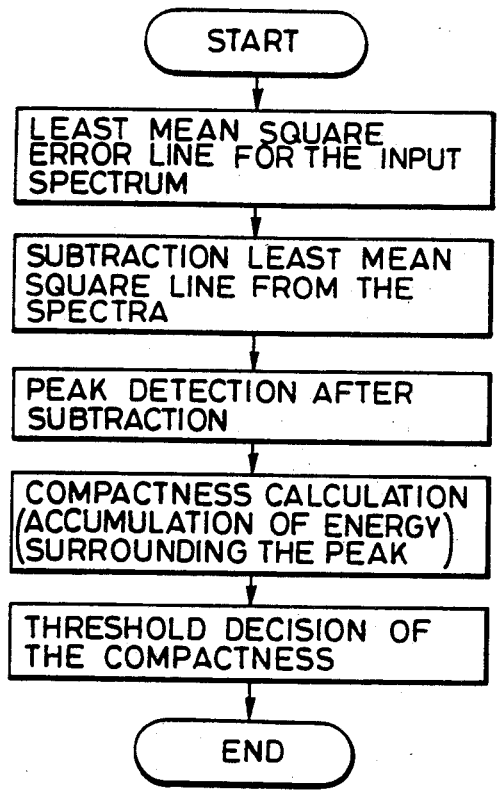
FIG. 3(a) is an explanatory view of the flow of processing for detecting a feature specific to a phoneme.

An example of the procedure for processing is described for CMPCT shown in FIG. 2. The processing of the name CMPCT is a processing designed to detect whether in the feature vector (frequency spectrum is considered as the feature pattern) at each time of the feature vector series, energy is concentrated in particular bands of frequencies (referred to as compactness). A flowchart of this processing is shown in FIG. 3(a).

Figure 3B:
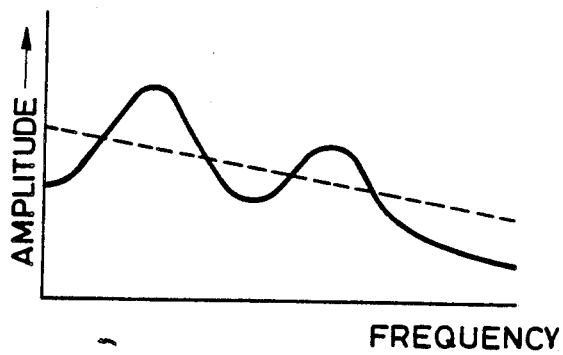
FIG. 3(b) is an example of a spectrum and least square line for a feature vector.
Figure 3C:
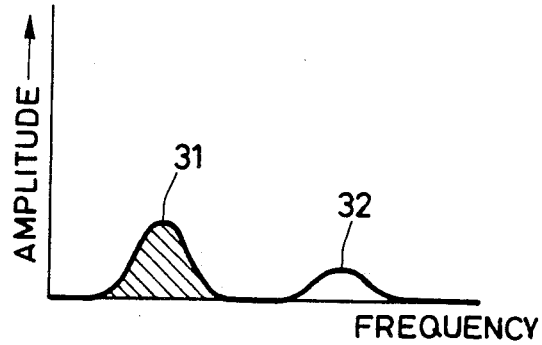
FIG. 3(c) is an example showing the least square line subtracted from the spectrum.

A least square line is firstly determined for the feature vector (spectrum) each time. Examples of the spectrum and the least square line are shown in FIG. 3(b). Then, the least square line is subtracted from the spectrum However, when the result is a negative value, it is forcibly made zero. An example of the results of this subtraction is shown in FIG. 3(c). Then, peaks in the pattern obtained after the subtraction are detected. The example shown in FIG. 3(c) shows two peaks 31, 32, and the larger peak 31 is selected Then, the energy surrounding the peak 31 is totalized, this being specifically done by calculating the area of the shadowed portion below the peak 31. This value of the area is considered as a value of compactness which is then subjected to a threshold decision using the previously set threshold value, and the presence of compactness is decided on the basis of the result of the threshold decision A description will now be made of the second memory. In the second memory are kept the name corresponding to the processing which is performed for the feature vector series in order to discriminate two categories in each pair of categories for all the categories of speech to be recognized, and the way of making a decision on the basis of the results of that processing. In this embodiment, it is assumed that objects for recognition are Japanese monosyllables which are held for each pair. In addition, it is assumed that only Japanese monosyllables having the same following vowel are selected in the candidate selection unit and pair discrimination is performed only for Japanese monosyllables having the same following vowel.

FIG. 4 schematically shows some of the contents stored in the second memory As shown in the drawing, the name of the processing which is performed for each pair of Japanese monosyllables in order to discriminate the two monosyllables is given, and the way of making a decision which is performed in accordance with the results of that processing is also given in the right column corresponding to each name For example, it is found that the processing of the name CMPCT is performed in order to discriminate /ka/ and /ta/ in the third step in FIG. 4, so that judgment is made as to whether compactness (energy being concentrated in particular bands of a spectrum) appears or does not appear in the feature vector series In addition, it can be seen from the column for the interpretation of the processing results that, when compactness is detected, a monosyllables is decided to be /ka/, that when no compactness is detected, a monosyllable is decided to be /ta/, and that when the result is intermediate, no decision is made (with the possibility that it may be /ka/ or /ta/).

Although the methods of processing in the feature extraction unit 2, the candidate selection unit 3, the pair generation unit 4, the pair discrimination unit 5, and the decision unit 8 are omitted from the above description of the embodiment, these methods are briefly described below.

Figure 5:
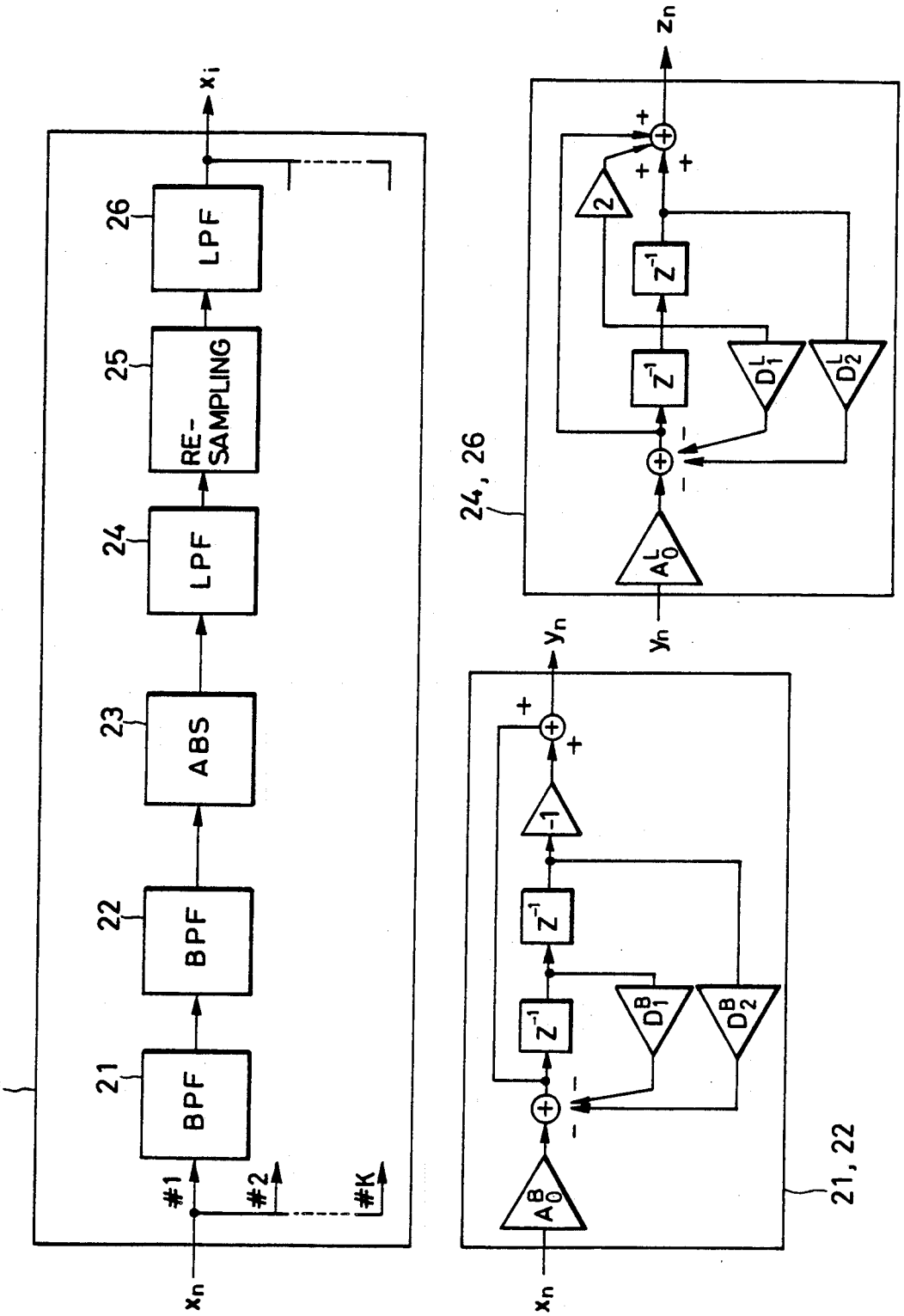
FIG. 5 is a drawing of a method of realizing a feature extraction unit 2 in the embodiment.

Examples of processing performed in the feature extraction unit include filter bank analysis and linear prediction analysis (LPC), though the embodiment of the present invention utilizes filter bank analysis FIG. 5 shows an embodiment of filter bank analysis Input speech $x_n$ is input in a plurality of BPF groups 21, 22 which have different central frequencies and band widths. This embodiment has a two-step BPF configuration in order to increase the resolution of frequencies.

BPF 21, 22 are secondary Butterworth filters which each comprise two adders, four multipliers, and two delayers. The waveform obtained from BPF is rectified by an absolute value converter (ABS) 23 and high-frequency components are cut by LPF 24, a sampler 25, and LPF 25 to form an output pattern $x_i$. Each of LPFs 24, 26 has a two-steps configuration in order to increase the resolution of frequencies in the same way as BPF, and has a Butterworth type on the processing scale which is the same as that of BPF The configuration of an LPF is described in detail in "Digital Low Pass Filter", Japanese Patent Laid-Open No. 135981/1980.

There are several methods of processing in the candidate selection unit, but the embodiment of the present invention uses template matching which has been conventionally used, so that the high-ranking candidates obtained by template matching (n candidates having smaller distance values) are output A method of realizing template matching is described in the report "Minimum Prediction Residual Principle Applied to Speech Recognition" by F. Itakura et al, IEEE Trans. on Acoustic, Speech and Signal Processing, Vol. ASSP-23, pp 57–72, February 1975. Although this report uses a likelihood ratio as a distance measure, the embodiment of the present invention may use a Euclidean distance between feature vectors (spectra) as a distance measure.

Figure 6:
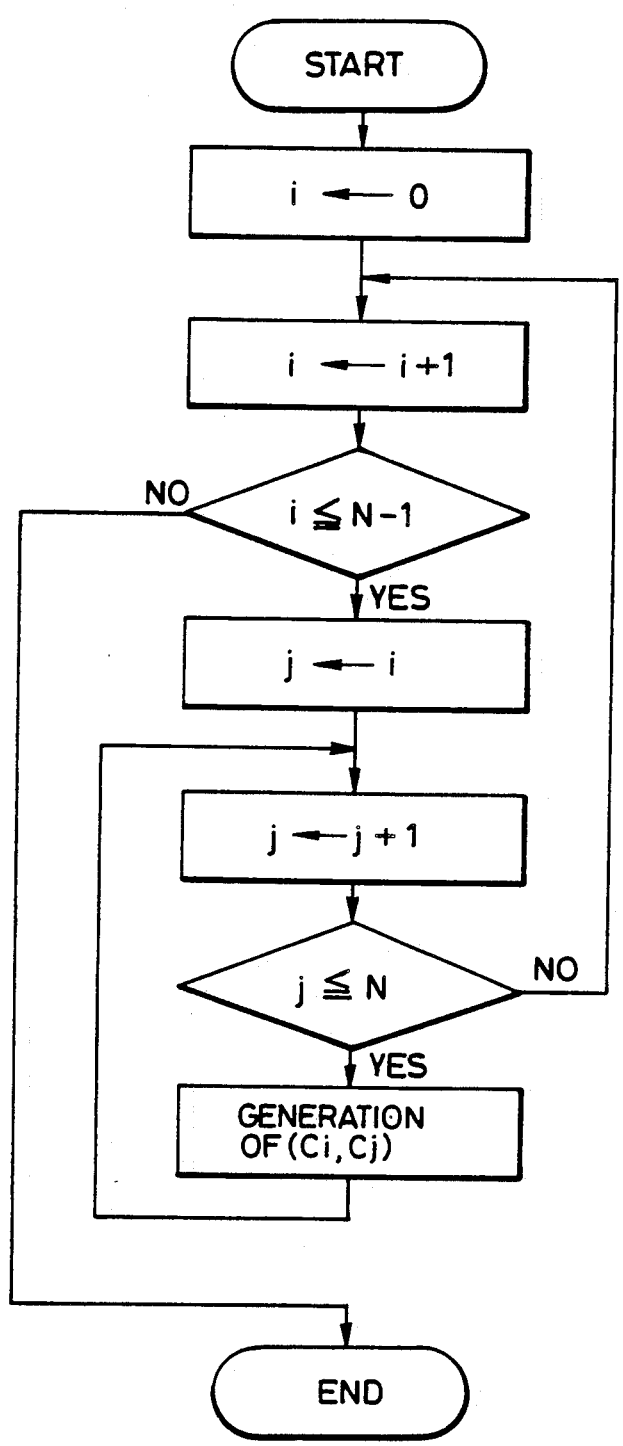
FIG. 6 is a drawing of a method of realizing a pair generation unit 4.

The pair generation unit 4 generates all the $_nC_2$ pairs which can be thought of for n candidates obtained from the candidate selection unit 3. This processing is a simple combinational calculation and can easily be realized by suitable software. FIG. 6 shows an example of a flow of the process. In this drawing, n categories of speech which are selected as candidates are denoted by $C_1, C_2, \ldots C_n$. In accordance with the flow, a total of $_nC_2$ pairs of categories are generated in the order of $(C_1, C_2), (C_1, C_3), \ldots (C_1, C_n), (C_2, C_3), \ldots (C_{n-1}, C_n)$.

It can be thought that pairs of categories which do not require pair discrimination have been previously registered in the pair generation unit 4 so that, when such pairs of categories are contained in the n number of high-ranking candidates, the generation of such pairs of categories would be omitted.

Such pairs are pairs which lack any possibility of error occurrence in the order relationship of the candidates obtained in the candidate selection unit If the generation of such pairs is omitted, the processing amount can be reduced, and errors in the processing of pair discrimination for such pair can be avoided, as well as precision being increased.

An embodied configuration of the pair discrimination unit 5 is described below with reference to FIG. 7. The pair discrimination unit performs the control of pair discrimination on the basis of the information stored in the first and second memories. When a pair of categories $(C_i, C_j)$ is firstly input in this unit, the information with respect to a pair $(C_i, C_j)$ stored in the second memory is interpreted in a discrimination rule interpretation unit 51. Since the second memory has the form of a table, as described above in FIG. 4, the interpretation can easily be realized by referring to the table. The two items of information read out from this table are the name of the processing which is performed in order to discriminate the pair $(C_i, C_j)$ and the way of interpreting the results of that processing. The name of the processing is firstly sent into a phoneme feature detector drive 52 in which the procedure for processing corresponding to the name is obtained by referring to the first memory and the processing is then started On the other hand, the way in which the results of the processing are interpreted is sent into a detection result interpretation unit 53. In the detection result interpretation unit 53, the results of the processing obtained from the phoneme feature detector drive 52 are interpreted on the basis of the way of interpretation so that the results of discrimination may be obtained. The way of interpreting results of the processing is, as described above in FIG. 4, shown in the form of three columns. The interpretation can therefore be performed by detecting each feature specific to a phoneme as the output of three values (presence of a feature, absence of a feature, intermediate state) in each processing, and by referring to the table in accordance with the output.

Lastly, an aggregation table, as shown in FIG. 8, is prepared in a decision unit 8, and the result of the pair discrimination is written in each square (or column). This drawing shows a case in which there are five candidates /ka/, /ta/, /ja/, /pa/, /ga/. The result of the pair discrimination for a pair of categories of speech $(C_i, C_j)$ is written in a square in a line i and a column j, and when a category is determined to be $C_i$, (O is written, while when it is determined to be $C_j$, X is written. The numbers of O and X and are totalized in the lateral direction for each $C_i$ and written in the right column. The pair discrimination unit sometimes produces intermediate results that a category cannot be determined as being either of the two categories of speech $C_i$ and $C_j$. In such a case, there are several ways of thinking about how such results are to be treated in the aggregation, but the embodiment of the present invention uses a method in which a category is forcibly determined to be O or X on the basis of the order of the candidates obtained from the candidate selection unit. In this way, the results of pair discrimination are completely aggregated, and the candidates are ranked in the order of the total numbers of O and then output. In the example shown in the drawing, a Japanese monosyllable /ka/ is a correct answer.

A method can be thought of as a method of deciding the order of the candidates in which the total numbers of O decided by pair discrimination are not simply used, but the results obtained by totalizing weighed numbers of O obtained from the pair discrimination in consideration of a given weight for each pair. Consequently, the reliability of each pair discrimination processing can be reflected in the final results.

In addition, if the results of pair discriminating are not only obtained as binary values O and X, but obtained by giving each category certain marks corresponding to the results of discrimination (for example, 100 full marks are divided into two categories) and these marks are totalized in each pair discrimination, final decision can be made with high precision on the basis of this method.

FIG. 9(a) shows the results obtained by a recognition experiment in respect of the total of 2360 Japanese monosyllables which are uttered by three men by using the embodiment of the present invention. In this experiment, the eight types of processing shown in FIG. 2(a) had been previously prepared in the first memory, and the items of information with respect to the fourteen syllables alone shown in FIG. 9(b) had been prepared in the second memory In this experiment, the candidate selection unit 3 utilized standard patterns and template matching so that the candidates could be previously ranked therein. Any monosyllables having no corresponding information in the second memory 7 are not subjected to pair discrimination processing, but are decided on the basis of the order obtained from the candidate selection unit 3. Only those monosyllables having information in the second memory 7 are subjected to pair discrimination.

Figure 10:
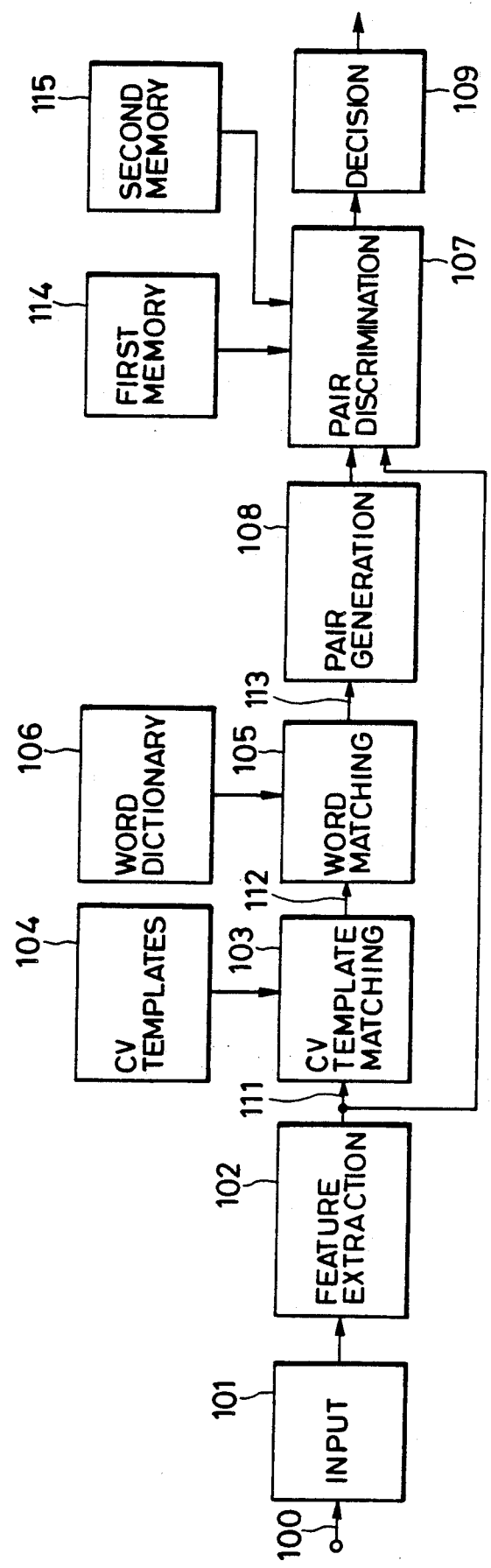
FIG. 10 is a block diagram of another embodiment of the present invention.

The second column of FIG. 9(a) shows the result obtained when the order obtained from the candidate selection unit 3 is considered as it is, as a result of recognition, and the third column shows the number of corrections obtained by further applying pair discrimination. Therefore, the difference between these two numbers exhibits one effect of the embodiment of the present invention, and it can be seen that an adequate effect can be obtained by only using information with respect to fourteen pairs Another embodiment of the present invention will also be described below with reference to FIG. 10. FIG. 10 shows an embodiment which concerns a word speech recognition apparatus and which is capable of obtaining results of recognition with higher reliability by feeding the information obtained from a linguistic processing unit back to an acoustic processing unit. Specifically, recognition is achieved by outputting a plurality of word candidates, determining pairs of monosyllables which are of different types in the monosyllables constituting the word candidates for each pair of word candidates, and performing pair discrimination for each pair of monosyllables in accordance with previously prepared pair discrimination rules so that words are selected from the above-described plurality of word candidates on the basis of the results of pair discrimination.

This embodiment is described in detail below.

In this embodiment, with respect to pairs of words which remain as candidates in a word dictionary matching unit, the minimum number of pairs of syllables which need to be discriminated in order to discriminate these word candidates are subjected to pair discrimination in respect of monosyllable pairs. Words are selected from the above-described remaining candidates on the basis of the results of this pair discrimination.

Although a word can be denoted as a series of monosyllables, there are an enormous number of series of monosyllables However, the number of words which are actually present is much smaller than that of the series Therefore, the range of a search for possibilities is greatly reduced by limiting the range of word candidates by way of matching with a word dictionary. In addition, so long as correct monosyllables are contained in high-ranking candidates used for the recognition of monosyllables by performing pattern matching with a monosyllable unit, it can be ensured that the word candidates contain correct words. In other words, the range of search is reduced under the guarantee that correct words are contained, and thus the efficiency of search and the precision of recognition can be increased.

In FIG. 10, reference numeral 101 denotes an input unit for word speech; reference numeral 102 a feature extraction unit for input word speech; reference numeral 103 a CV template matching unit which performs matching of the feature parameters output from the feature extraction unit 102 with Japanese monosyllable standard patterns stored in a CV template unit 104 and outputs monosyllable candidates; reference numeral 105 a word dictionary matching unit which generates connections of the monosyllable candidates output from the CV template matching unit 103 and performs matching thereof with a word dictionary 106; reference numeral 108 a pair generation unit which generates pairs of monosyllables required for discriminating all the pairs of word candidates which are output from a word dictionary matching unit 105; and reference numeral 107 a pair discrimination unit which performs pair discrimination for the monosyllable pairs output from the pair generation unit 108 on the basis of the feature parameters output from the feature extraction unit 102 in accordance with the rules of pair discrimination which are stored in a first memory 114 and a second memory 115 In the first memory 114 are stored a plurality of processings for pair discrimination that are undertaken in order to detect features specific to a particular phoneme from the feature parameters. In the second memory 115 are stored items of information in regard to which way of processing stored in the first memory 114 is suitable for discriminating the specified pair of monosyllables Reference numeral 109 denotes a decision unit which aggregates the results of pair discrimination output from the pair discrimination unit 107 and decides the final output. Reference numeral 100 denotes input word speech; reference numeral 111 the above-described feature parameters; reference numeral 112 series of monosyllable candidates; and reference numeral 113 word candidates.

The operation of this embodiment is summarized below.

The input word speech 100 input from the input unit 101 is converted into a series of feature parameters which indicate the features of the speech in the feature extraction unit 102, and matching is then performed between the feature parameters and all the standard monosyllable patterns which have been previously stored in the CV template unit 104 in the CV template matching unit 103 so that the similarity may be calculated.

As a result of this calculation, a certain number of monosyllable candidates are obtained from the CV template matching unit 103 in the order of similarity in a monosyllable unit, and the series of monosyllable candidates 112 are output for the input word speech in the form shown in FIG. 11(a). The example shown in FIG. 11 is a case where the word "YOKOHAMA" (the name of a place in Japan) consisting of four syllables is input, and FIG. 11(a) shows the three monosyllable candidates of higher rank which are output for each monosyllable.

Then, the word dictionary matching unit 105 generates possible connections of the monosyllable candidates from the series of the monosyllable candidates which are obtained in the form shown in FIG. 11(a). In this example, $3^4=81$ connections are generated. All the connections are matched with the word dictionary 106 so that only the connections of the monosyllable candidates which are present in the word dictionary 106 are sent as word candidates into the pair generation unit 108. In this example, the word candidates are the two words "YOKOHAMA" and "YOKOKAWA" shown in FIG. 11(b).

In the pair generation unit 108, the pairs of different monosyllables which constitute the word are determined for each pair of the input word candidates In this example, the two pairs ("HA", "KA") and ("MA", "WA") shown in FIG. 11(c) are obtained The processing stored in the first memory is performed for these monosyllable pairs in accordance with the rules of pair discrimination which have previously been stored in the second memory 115 in accordance with the feature parameter series 111 so as to obtain the results of discrimination to the effect that a syllable is either of the two monosyllables, and the results are sent to the decision unit 109.

In the decision unit 109, the results of the pair discrimination performed for each monosyllable pair and obtained from the pair discrimination unit 107 are totalized so that all the word candidates output from the word dictionary matching unit 105 are ranked, and a certain number of word candidates of higher rank are output as the final output In this case, information with respect to the word is added so as to enable a decision to be made.

In this embodiment, the range of monosyllables which apparently require discrimination from an acoustic viewpoint can greatly be reduced by the effect of limiting word candidates, as compared with the full range of monosyllables to be recognized This embodiment therefore offers the advantage that the throughout is reduced and the precision with which monosyllables are recognized is increased As described above, in a word speech recognition apparatus which outputs a plurality of word candidates, this embodiment is provided with a means in which pairs of different kinds of monosyllables are obtained from the monosyllables constitute the word candidates for each pair of word candidates, and pair discrimination is performed for each of the pairs of monosyllables in accordance with the rules of pair discrimination which have previously been prepared so that words are selected from a plurality of candidates on the basis of the results of pair discrimination. Therefore, this embodiment can realize a word speech recognition apparatus in which the range of word candidates is restricted by effectively employing acoustic information and acoustic recognition processing is performed in the restricted range, so that the precision of recognition can be increased and the throughput can be reduced.

As described above, since the present invention can perform fine processing for each pair of categories of speech to be recognized, the performance of recognition of similar types of speech can be improved.

In addition, since all the procedures of processing are held in explicit forms, a position at which an error occurs can easily be specified, the process of improving the performance can be systematized, and knowledge can be accumulated.

What is claimed is:

1. A speech recognition apparatus comprising:
   means for inputting speech;
   feature extraction means for extracting feature vectors from the input speech in each of a series of predetermined times and obtaining a feature vector series;
   candidate selection means for selecting as candidates, candidates of various phonemes from said feature vector series;
   means for generating a plurality of pairs of candidates from candidates which are selected by said candidate selection means, wherein each pair of candidates includes candidates of different types;
   means for performing a pair discrimination for each candidate of each pair of candidates by performing a predetermined process on said feature vector series and for ranking said selected candidates based on said pair discrimination operation of each candidate of each pair of candidates, thereby representing which candidate of each pair of candidates corresponds to said input speech;
   a first memory for storing procedures of processes to be performed in order to detect features specific to a particular phoneme from said feature vector series; and
   a second memory for storing procedures of processes to be performed for each of a plurality of phonemes, all of which being phonemes of said input speech to be recognized, in order to discriminate between each phoneme of each pair of phonemes and for storing information providing interpretations of results of said processes;
   said pair discrimination operation being performed by said pair discrimination means based on said procedures stored in said first memory and said procedures and information stored in said second memory.

2. A speech recognition apparatus according to claim 1, wherein said procedures of said processes to be performed in order to detect features specific to a particular phoneme stored in said first memory have variable parameters in each procedure of each process to be performed in order to detect a feature specific to a particular phoneme.

3. A speech recognition apparatus according to claim 2, wherein particular values of said variable parameters which must be set during a process are stored in said second memory in addition to names of said processes performed for each pair of phonemes and said information providing interpretations of results of said processes.

4. A word speech recognition apparatus which recognizes every word of input speech based on a word dictionary and outputs a plurality of various word candidates, each of said word candidates being composed of a plurality of monosyllables, said apparatus comprising:
   feature extraction means for analyzing said input speech at each of a series of predetermined times and for generating a feature vector series;
   means for determining pairs of different types of monosyllables of various word candidates from said feature vector series;
   memory means for storing information of processes to be performed on said feature vector series in order to discriminate acoustically between two monosyllables in each pair of monosyllables to recognize monosyllable composing words and for storing information providing interpretation of results of said processes;

pair discrimination means for reading out information corresponding to each pair of said determined monosyllables from said memory means and for discriminating between each determined monosyllable of each pair of determined monosyllables of said feature vector series in accordance with said read out information; and means for ranking word candidates based on said pair discrimination operation performed by said pair discrimination means, thereby representing which determined monosyllable of each pair of determined monosyllables corresponds to said input speech.

5. A speech recognition apparatus capable of discriminating similar acoustic features of speech comprising:

input means for inputting speech:

feature extraction means for analyzing said input speech at each of a series of predetermined times and for generating a feature vector series;

candidate selection means for selecting high-ranking candidates of various categories which are presented in said feature vector series;

pair generation means for generating a plurality of pairs of candidates from said candidates selected by said candidate selection means, wherein each pair of candidates includes candidates of different types;

memory means for storing information of processes to be performed on said feature vector series in order to discriminate acoustically between two categories in each of a plurality of pairs of categories for categories of speech to be recognized and for storing information providing interpretations of results of said processes;

pair discrimination means for reading out information corresponding to each pair of said selected candidates from said memory means and for discriminating between each candidate of each pair of selected candidates of said feature vector series in accordance with said readout information; and means for ranking said selected candidates based on said pair discrimination operation performed by said pair discrimination means, thereby representing which candidate of each pair of candidates corresponds to said input speech.

6. A speech recognition apparatus according to claim 5, wherein said candidate selection means further comprises a word dictionary matching means for generating connections between said selected candidates and matching said connected candidates with words stored in memory.

7. A speech recognition apparatus according to claim 5, further comprising decision means for deciding a most likely candidate from said pairs of candidates as a result of recognition of said inputted speech.

8. A speech recognition apparatus according to claim 7, wherein said decision means decides which candidate occurs a maximum number of times as determined from said pair discrimination operation.

9. A speech recognition apparatus according to claim 7, wherein said decision means performs a decision using information of various words stored in a memory.

10. A speech recognition apparatus according to claim 7, wherein said decision means performs a final decision using information of various words stored in memory.

11. A speech recognition apparatus according to claim 5, wherein said information of said processes stored by said memory means includes processes for detecting in said feature vector series plosive, fricative and buzz-ber.

* * * * *